(12) United States Patent  
Balinsky et al.

(10) Patent No.: US 8,484,477 B2  
(45) Date of Patent: Jul. 9, 2013

(54) DOCUMENT MANAGEMENT SYSTEM AND METHOD

(75) Inventors: Helen Balinsky, Wales (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 208 days.

(21) Appl. No.: 13/017,032

(22) Filed: Jan. 30, 2011

(65) Prior Publication Data

US 2012/0198237 A1 Aug. 2, 2012

(51) Int. Cl.
*H04L 9/32* (2006.01)

(52) U.S. Cl.
USPC .......................................... 713/176; 707/822

(58) Field of Classification Search
USPC .......................................... 707/822; 713/176
See application file for complete search history.

(56) References Cited

U.S. PATENT DOCUMENTS

| | | | |
|---|---|---|---|
| 5,935,246 A * | 8/1999 | Benson | 726/28 |
| 7,587,368 B2 | 9/2009 | Felsher | |
| 7,831,827 B2 | 11/2010 | Walmsley | |
| 7,831,829 B2 | 11/2010 | Appenzeller et al. | |
| 2003/0014638 A1 * | 1/2003 | Lincoln et al. | 713/178 |
| 2003/0217264 A1 * | 11/2003 | Martin et al. | 713/156 |
| 2006/0190723 A1 * | 8/2006 | Benson | 713/165 |
| 2007/0061358 A1 | 3/2007 | Brooks et al. | |
| 2007/0101007 A1 | 5/2007 | Brown et al. | |
| 2008/0091473 A1 | 4/2008 | Choppin | |
| 2008/0306759 A1 | 12/2008 | Ilkin et al. | |
| 2010/0114780 A1 | 5/2010 | Tribe et al. | |
| 2010/0299313 A1 * | 11/2010 | Orsini et al. | 707/652 |

* cited by examiner

*Primary Examiner* — Shyue Jiunn Hwa

(57) ABSTRACT

A document management system includes a number generator and/or a secure controller, and a document. The document includes a map-file for each participant in a workflow of the document. Corresponding, randomly generated nonces and/or complementary workflow assurance tokens are distributed within the respective map-files of neighboring participants by the number generator or the secure controller. The system includes a private key that recovers the respective corresponding, randomly generated nonce of a receiving one of the neighboring participants and/or the respective complementary workflow assurance token of the receiving one of the neighboring participants. A communication mechanism enables transmission of the recovered corresponding, randomly generated nonce of the receiving one of the neighboring participants or a signature generated by the receiving one of the neighboring participants to a sending one of the neighboring participants for verification.

20 Claims, 1 Drawing Sheet

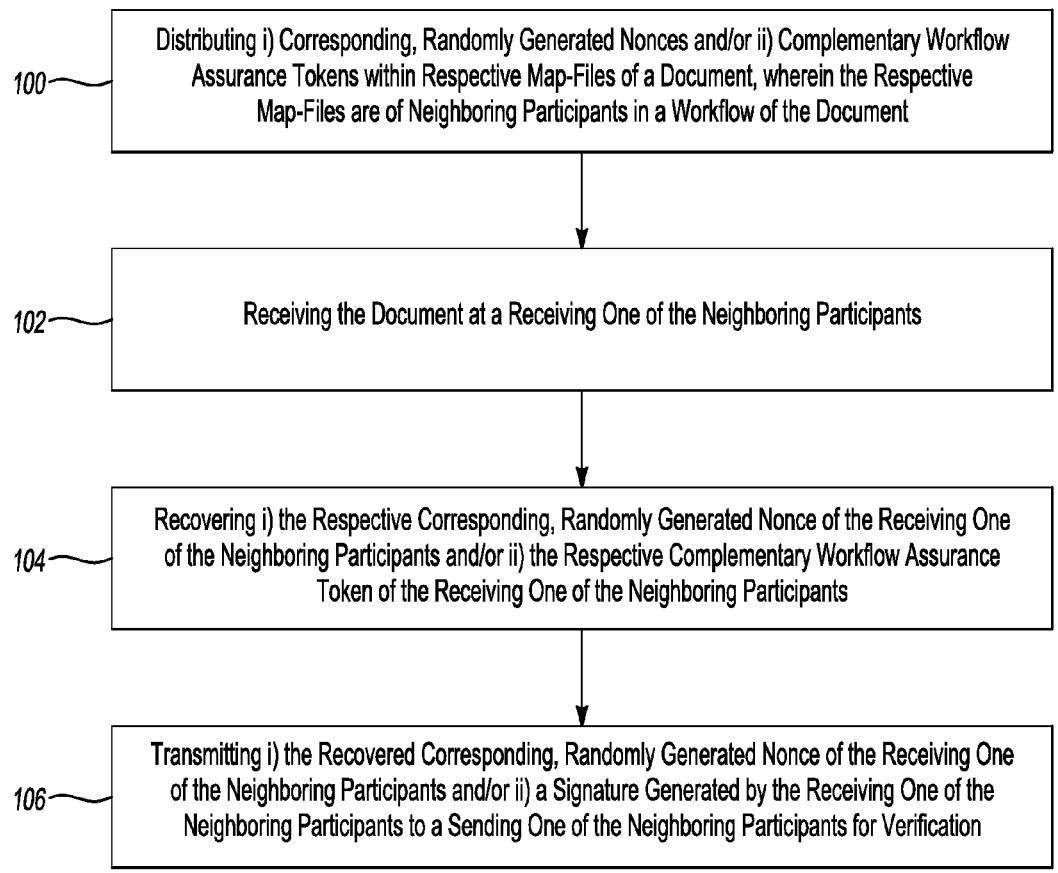

DOCUMENT MANAGEMENT SYSTEM AND METHOD

BACKGROUND

The present disclosure relates generally to a document management system and method.

Many documents have become a mixture, or a composite, of differentially formatted parts. Composite documents may be presented to a user by specialized software as one editable, browsable, approvable, playable document. Different parts are combined together through various serialization mechanisms, e.g. java jar-archive, HP dlf, etc. One example of a composite document is a document-based proposal, including product jpeg-images, a marketing way-clip, a ppt-presentation and an xsl-spreadsheet with financial details.

In many instances, multiple workflow participants contribute to different parts of composite documents with different access levels. It may also be desirable or necessary to export a composite document outside of a secured environment and then, after the document is updated, re-import the document back into the secured environment. When publicly-posted composite documents are distributed over non-secure channels, documents may inadvertently become lost (i.e., never delivered to the intended recipient) or be delivered in non-authentic form.

BRIEF DESCRIPTION OF THE DRAWING

Features and advantages of examples of the present disclosure will become apparent by reference to the following detailed description and drawing.

FIG. 1 is a flow diagram depicting an example of a document management method according to the present disclosure.

DETAILED DESCRIPTION

Examples of the document management system and method disclosed herein are used to guarantee that composite documents are propagated along their workflows. In particular, the system and method may be used to ensure that a workflow is not silently terminated prior to its completion (e.g., due to a recipient never receiving a document, a document being discarded as spam, a document being shipped to an unintended recipient, a recipient being unavailable, etc.). The system and method disclosed herein enable failures in a workflow to be detected, for example, by alerting the current workflow participant that the document was not delivered to the next participant. The system and method disclosed herein also enable failures to be logged and/or reported to a document workflow master or administrator, which provides assurance that the document actually moves along the workflow according to specified constraints.

As used herein, the term "workflow" refers to a defined set of stages, usually with task(s) at each stage, which a composite document must pass through during its lifecycle. A composite document is a document including several items (e.g., PDFs, PPTs, DOCs, etc.). In one example, the workflow is an automated process during which documents, information, and/or tasks are passed from one participant to another for action or informative purposes, according to a set of procedural rules. Workflows include imaging workflows (e.g., quality assurance, authentication, forensics, etc.), supply chain workflows (e.g., track and trace, inspection, shipping/receiving, recall, etc.), environmental or sensor data monitoring workflows, or other suitable workflows (e.g., statistics (e.g., inventory, etc.), compliance, auditing, etc.). In other words, a workflow is any defined set of tasks to complete associated with a composite document.

A workflow may involve numerous participants, many or all of whom do not or may not know the other participants. The composite document that is the subject of the workflow may be transferred between workflow participants by any available channel, including, for example, electronic mail (e-mail), any publicly shared memory device (e.g., a compact disc (CD), a digital video disk (DVD), a universal serial bus (USB) key, etc.), public posting systems (e.g., cloud computing systems where documents may be uploaded and downloaded, file sharing systems (e.g., Sharepoint, etc.)), or the like.

Each workflow participant is provided with the entire composite document, although one or more parts of the composite document may be accessible for reading only, accessible for reading and writing, or not accessible for reading or writing. It is desirable to provide the entire composite document because later participant(s) in the workflow may require access to parts that an earlier workflow participant cannot access.

In the examples disclosed herein, the composite document includes i) individual content items or parts, each of which consists of multiple individual files and fragments, ii) one or more map-files for each participant in the workflow, each map-file providing differential access for the respective participants, and, in some instances, iii) an entry table, which is a fast filtration mechanism to identify a participant's map-file without exposing the participant's identity. A "map-file" is a subset of access keys to document parts corresponding to the access granted to a particular participant, where each map-file is encrypted and signed for each participant individually.

In order to provide controlled differential access to a content part, the part is encrypted by its own specially-generated and assigned encryption key $E_{i/p}$. An extra pair of keys for each part is provided, namely a signature key $S_{i/p}$ and a signature verification key $V_{i/p}$. The access control for a composite document part is thus enabled by 4 keys: $\{\{E_{i/p}, D_{i/p}\}, \{S_{i/p}, V_{i/p}\}\}$, where $D_{i/p}$ is the decryption key. Read only access is controlled by having or not having decryption key $D_{i/p}$. Read and write access requires three keys $E_{i/p}, D_{i/p}, S_{i/p}$. An item will be decrypted using $D_{i/p}$, modified as needed, encrypted using $E_{i/p}$ and then signed using $S_{i/p}$. A workflow participant without any granted access to a content part is given a signature verification key $V_{i/p}$ that will allow the user to validate item authenticity (i.e., the user has validate access).

As such, every item/part of a composite document is signed by its own signature key $S_{i/p}$ and every workflow participant is securely given the corresponding signature verification key $V_{i/p}$ for each item/part, irrespective of the type of granted access. Upon reception, it is mandatory that every workflow participant verifies the signature of every item/part using the corresponding signature verification key $V_{i/p}$. Participants can access for reading only those parts for which he/she is given the corresponding decryption key $D_{i/p}$ and can modify only those parts for which he/she is given $E_{i/p}, D_{i/p}, S_{i/p}$. The user uses $E_{i/p}$ to encrypt modified contents and generate a new signature using $S_{i/p}$, which is validated by the subsequent workflow participant.

In the examples disclosed herein, a document delivery confirmation token (in the form of nonces and/or workflow assurance tokens) is also included (in addition to the previously mentioned keys) that aims to address the problems of premature silent workflow termination. In one example, the document delivery confirmation token includes corresponding, randomly generated nonces within the respective map-files of neighboring participants. A random number generator of the document management system generates corresponding nonces (e.g., a random binary string), which are then distributed within the respective map-files of neighboring participants.

As will be described in further detail hereinbelow in reference to FIG. 1, in one example, these randomly generated corresponding nonces function as a shared secret between the neighboring participants, and can be used to verify that the composite document has been received by the next participant(s) in the workflow. In another example, the document delivery confirmation token includes one-time complementary workflow assurance tokens within the respective map-files of neighboring participants. A secure controller of the document management system generates special keys (discussed further hereinbelow), which are then distributed within the respective map-files of neighboring participants. As will be described in further detail hereinbelow in reference to FIG. 1, in one example, the keys may be used to generate a digital signature and then verify the digital signature. This approach proves to the sender that the document was received as it was sent, as well as it was received, by the correct workflow participant. In still another example, the composite document includes both the randomly generated nonces and the one-time complementary workflow assurance tokens.

"Neighboring participants" are workflow participants who work on or access the composite document in a sequential manner. For example, participant i may work on the composite document and upload the composite document to a cloud computing system, and then participant i+1 may subsequently download the composite document from the cloud computing system and then work on the composite document. In another case, participant i could e-mail, post on CD/DVD, etc. the composite document to participant i+1. Participants i and i+1 are neighboring participants in the workflow. Generally, one of the neighboring participants is a sender of the document, and the other of the neighboring participants is the receiver of the document. It is to be understood that neighboring participants may include multiple receivers. This occurs when there is a split in the workflow, and multiple participants are accessing the document in any order after it is released by the sender (e.g., user A send to user B, and then users C, D and E can access the document in any order once the document is released by user B).

As previously mentioned, a user may identify his/her map-file(s) within a composite document using the entry-table. This involves encrypting a small known string of characters for each workflow participant. Each user attempts to decrypt the strings until the correctly decrypted string is found. Examples of entry tables may be found in U.S. patent application Ser. No. 12/949,510, filed Nov. 18, 2010.

Referring now to FIG. 1, steps of an example of the document management method are illustrated. As shown at reference numeral 100, the number generator distributes corresponding, randomly generated nonces within the respective map-files of the neighboring participants and/or the secure controller distributes complementary workflow assurance tokens within the respective map-files of the neighboring participants. The method further includes receiving the document at a receiving one of the neighboring participants (see reference numeral 102), recovering i) the respective corresponding, randomly generated nonce of the receiving one of the neighboring participants and/or ii) the respective complementary workflow assurance token of the receiving one of the neighboring participants (see reference numeral 104), and transmitting i) the recovered corresponding, randomly generated nonce of the receiving one of the neighboring participants and/or ii) a signature generated by the receiving one of the neighboring participants to a sending one of the neighboring participants for verification (see reference numeral 106). Each of these steps will be described further hereinbelow.

It is to be understood that any random nonce may be utilized. The randomly generated nonces in the neighboring map-files may be matching (i.e., identical) or complementary. It is to be understood that the randomly generated nonces are used once, and not repeated between various workflow steps and/or documents. As such, a first set of neighboring participants shares the first randomly generated nonce and a second set of neighboring participants shares the second randomly generated nonce that is different from the first randomly generated nonce. For example, once the randomly generated nonce is generated for workflow step i and given to i participant and his neighboring participant i+1, the randomly generated nonce is not reused.

One example of nonces ($N_{i-1}$, $N_i$, $N_{i+1}$) distributed in the corresponding map-files of a composite document is illustrated below:
(i−1) participant map-file
<shipment_nonce="$N_{i-1}$"
confirmation_verification_key="$V_{i-1}$">
i-participant map-file
<reception_nonce="$N_{i-1}$" confirmation_signature_key="$S_{i-1}$">
<shipment_nonce="$N_i$"
confirmation_verification_key="$V_i$">
(i+1)-participant map-file
<reception_nonce="$N_i$" confirmation_signature_key="$S_i$">
<shipment_nonce="$N_{i+1}$"
confirmation_verification_key="$V_{i+1}$">

It is to be understood that multiple different corresponding nonces may be simultaneously managed for splits in the workflow. For example, if there are multiple i+1 participants (e.g., $i+1_A$, $i+1_B$, etc.), the map-file for i may include a nonce for each of the i+1 participants. The sender then verifies if the received nonce matches one of the nonces that he/she holds.

When a receiving participant obtains the composite document containing the nonce, the participant will be able to access the nonce in his/her map-file, which is decrypted using a private decryption key. The steps preceding the participant accessing the nonce are as follows. The receiving participant will use his/her private decryption key to identify his/her corresponding entry in the entry table. From this entry, the participant is able to recover his/her map-file name and map-file decryption key generated for this user for this workflow step. Once the map-file is identified and decrypted, the nonce that is the workflow token is recovered and shipped to the previous participant (e.g., the sender).

In the examples disclosed herein, in addition to or instead of nonces, complementary workflow assurance tokens (i.e., pairs of specially generated verification and signature keys (e.g., $V_i$ etc. and $S_i$ etc.)) may be distributed for pairs of sequential workflow participants (i.e., neighboring participants) accordingly. These are one-time signature and verification keys generated for the sender—receiver pair by a secure controller of the authoring tool (described below). The signature verification key (e.g., $V_{i-1}$) from each pair is provided to the sender (e.g., i−1) via his/her map-file and the corresponding signature key (e.g., $S_{i-1}$) is provided to the receiver (e.g., i) via his/her map-file. All of these keys are provided within corresponding map-files for each workflow participant. It is to be understood that each map-file is also individually encrypted and signed, and can alone be accessed by the corresponding workflow participant at the corresponding step. Thus, the correct document receiver alone may recover the signature key that corresponds to the verification key currently held by the sender. Once the receiver recovers this signature key from his/her map-file, he/she generates the signature of the original version of the received document. Then the receiver ships back this signature to the sender. The sender verifies the received signature for this document using the corresponding signature verification key, his/her retained copy of the document (i.e., the version of the document just prior to being sent), and the received signature. The signature verification key that the sender received within his key map-file is for the purpose of document shipment. If the signature is verified, the sender finishes the transaction by confirming that the document as sent was delivered to the valid workflow participant, as only a valid workflow participant is able to create the verified signature. "Signature", in these examples, refers to the standard Digital Signature, e.g., DSA.

In one example, the nonce can be used as a confirmation that the document is received by the valid workflow participant, who in turn verified the document, recovered his nonce and shipped it to the previous workflow participant. The nonce may also be sent as a confirmation directly to the document master or any other workflow watching service to confirm that the document has, in fact, propagated to the next workflow step. In a more advanced example, the complementary workflow assurance tokens (i.e., the specially generated verification and signature keys) may be used to generate the full document signature that can be shipped back and then verified by the previous workflow participant. In this example, the specially generated one-time signature key given to the receiver within his/her map-file is used to sign the current version of the document. The receiving participant then sends the generated signature back to the sending participant. Since the sending participant may be unknown to the receiving participant, the nonce or signature can be publicly posted using any public communication mechanism or channel associated with the system. It is to be understood that the workflow participants have access to some communication channel that allows them to ship the document and send the nonce or signature in the desired direction.

The workflow involves mandatory verification at each step, and each participant in the workflow is alerted to the fact that verification is required. As such, after sending the composite document, the sending participant will know to watch for the adequate confirmation as required by the workflow, e.g., the nonce or the signature. It is to be understood that the receiving participant need not post or send the entire composite document with the nonce or signature because the sending participant already has an authentic version of the document. As such, the nonce or signature alone may be posted or sent.

If the sending participant does not receive the nonce or signature within a particular amount of time, the sending participant can attempt to resend the composite document, contact the next workflow participant by another channel (if available), or inform the document master that he/she is unable to transfer the document to the next workflow participant. It is to be understood that when a transmission to a receiving participant fails, the nonce or signature remains secret because it can be decoded using the decryption key known by the corresponding workflow participants alone. As such, the transmission of the composite document may be attempted one or more additional times to ensure that the document has actually been shipped. Similarly, if the return communication to the sending participant (i.e., from the receiving participant) fails, then the nonce or signature may be sent any number of times because the document has already been received by the valid workflow participant.

When the nonce is transmitted back to the sending participant, upon receiving the nonce, the sending participant compares the received nonce with the nonce he/she retrieved from his map-file for this workflow step. If the nonces are matching, the sending participant can verify that the workflow properly progressed.

When the signature is transmitted back to the sending participant, upon receiving the signature, the sending participant uses his/her signature verification key. The sending participant receives the document signature from the next participant and then uses his/her signature verification key to verify the received signature.

The receiving participant then becomes the sending participant. He/she performs his/her workflow tasks and ships the document to the next participant(s). Since this is a different step in the workflow, the randomly generated nonce is particular to these neighboring participants and is not a replicate of the earlier randomly generated nonce.

The system distributes all of the nonces and/or signature and verification keys within the encrypted map-files at the outset of the workflow. For example, when the number of workflow participants is known, the number generator can assign random complementary nonces to each of the known map-files at the initiation of the workflow.

The composite document moves through the workflow, and the verification of nonces or signatures from one participant to the next allows the system to keep track of the document's progress. Since the receiving participant's transmission of the nonce or signature is mandatory, the system will recognize when a nonce or signature has not been verified. In one example, each workflow step or some of the workflow steps has/have to be accomplished or completed before preset deadlines, and nonce or signature verification has to take place within a preset amount of time of the expiration of this deadline. In this example, the system is programmed to recognize the expiration of the deadline and the preset amount of time. The failure to perform a nonce or signature verification within the preset amount of time triggers the system to generate a private message or alert for the document master or administer which identifies where in the workflow the failure has taken place. In one example, the system may be programmed to recognize the occurrence of verification events when workflow participants include on-line services, timestamps, incoming submission services, or the like.

The method disclosed herein can be further enhanced by generating a traceable and verifiable log within the composite document. The document log may provide a historical confirmation for the document transitions, and may be verified by subsequent audit(s). In one example, the log is made up of the transmitted nonces or signatures with the corresponding version of the document. In another example, the log may be made up of the nonces or signatures with the trimmed version of the document (i.e., the document constant part that does not change along the workflow, e.g., map-files and entry table) such that the signatures can be verified at a later date. In still another example, the log is made up of nonces that have been signed, either with or without a secure timestamp. The transmission of a nonce or signature indicates to the system that the receiving participant was able to access the nonce. The system can automatically create an entry in a document log identifying the nonce or signature transmission. This type of entry indicates that the composite document was received and a nonce or full document signature was obtained from the random nonce distributed within a particular participant's map-file. Multiple entries in the log indicate that the document is propagating along its workflow. Any entry into the document log may be associated with a timestamp. It is to be understood that the information in the log entry of the current document can be put by the document receiver alone, as he/she now holds the latest version of the document. As such, some log entries may require an extra transfer of confirmation information from the sender back to the receiver.

The full or partial document signature scheme can be deployed to guarantee the document transition. As previously mentioned, in some examples, the pair of signature and verification keys (e.g., $V_i$ etc. and $S_i$ etc. in the example given above) is generated for each sender—receiver pair, and the sender is provided with signature verification key from this pair and receiver is provided with the signature key from this pair. Depending on the workflow requirement, the sender may be asked to sign the entire composite document or its constant part, e.g., map-files, entry tables. In some workflows, the receiver might be asked to generate both signatures (i.e., the full signature and the constant part signature). Both signatures could be verified by the sender. The signature of the constant part may be placed by the receiver into the composite document log file and can be used for the future document history audit. This is due to the fact that the composite document constant part remains unchanged while the document propagates along its workflow and other parts are being modified. Thus, the sequence of accumulated sequential signatures of the constant part of the document may be verified and audited at later stages/by the document master.

The document log may be used to set the transformation/transition to the next state of the workflow and/or to set the characteristics/settings of the next state of the workflow.

It is to be understood that in any of the examples disclosed herein, an executable may be embedded into the composite document or the map-file when shipping the nonce or signature back to the sending recipient. The addition of an executable will depend, at least in part, upon the presence or lack of presence of a service/daemon of the participant device/hardware. It is to be understood that the executable can be encrypted and signed as a content part of the composite document or its map-file, and thus its addition poses no additional security risk.

The publicly-posted composite document system disclosed herein includes a secure authoring tool and one or more individual computing systems that perform one or more steps of the method disclosed herein.

The secure authoring tool enables the document master to generate the composite document, the workflow, and the workflow tokens that guarantee workflow propagation. The document distribution version is exported by the secure authoring tool out of the master version of the document. The master version is retained in the secure location, while the secure distribution version is shipped among workflow participants by any available channel.

The individual computing systems may be stationary (e.g., desktop computers) or mobile (e.g., laptop computers, netbooks, cellular phones, personal digital assistants (PDAs), etc.)). The individual computing systems run one or more applications that enable the participants to obtain access to item(s) of the composite document according to preset (granted) access rights, and that perform decryption, encryption, signature verification, and/or signing.

In one example, the secure authoring tool is associated with a system that enables the composite documents to be uploaded and downloaded, or to be shared via a shared drive or a cloud computing network. In this example, a variety of workflow participants can access the composite documents from individual computers by accessing the shared drive or cloud computing network. The secure authoring tool may also be accessible via the Internet and unassociated with any particular shared drive or cloud computing network. In these instances, document(s) are transmitted via publicly shared memory devices, such as CDs, DVDs, USBs, etc. or any other suitable channel.

When part of the system, the shared drive or cloud computing network may be associated with a network of interconnected computers and/or other electronic devices (e.g., scanners, printers, etc.), including virtualized and/or redundant processors, banks of processors and/or servers, etc. It is to be understood that the components of the shared drive or cloud computing network may be implemented in a consolidated location, or portion(s) of the shared drive or cloud computing network may be implemented at different locations. In one example, the shared drive or cloud computing network is a virtualized bank of computers (e.g., processors and/or servers) that enables Internet-based computing (through which the secure authoring tool can be accessed). Software and data associated with the shared drive or cloud computing network are stored on servers and their associated memory.

The hardware of the shared drive or cloud computing network or individual computing systems includes an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor. Computer program(s) and/or software (e.g., computer readable code) may be loaded onto one or more of the sub-systems, and stored in a memory thereof. Such programs and/or software are executable via a processing device.

While several examples have been described in detail, it will be apparent to those skilled in the art that the disclosed examples may be modified. Therefore, the foregoing description is to be considered non-limiting.

What is claimed is:

1. A document management system, comprising:
   a processing device;
   a secure authoring tool including computer readable code, embodied on a tangible, non-transitory, computer readable medium, the code being executable by the processing device, the secure authoring tool including at least one of a number generator or a secure controller;
   a document generated using the secure authoring tool, the document including a map-file for each of a plurality of participants in a workflow of the document, each map-file providing differential access for a respective one of the plurality of participants;
   i) corresponding, randomly generated nonces; or ii) complementary workflow assurance tokens; or iii) both i and ii distributed within the respective map-files of neighboring participants by the number generator or the secure controller, wherein:
     a) a first of the nonces is provided in the map-file of a sending one of the neighboring participants, a second of the nonces is provided in the map-file of a receiving one of the neighboring participants, and the first and second nonces are identical; or
     b) the complementary workflow assurance tokens include a pair of specially generated signature and verification keys, the specially generated signature key is provided in the map-file of a receiving one of the neighboring participants, and the specially generated verification key is provided in the map-file of a sending one of the neighboring participants; or c) both a and b;

a private key that recovers at least one of the second nonce or the specially generated signature key; and a communication mechanism enabling transmission of at least one of the recovered second nonce or a signature generated by the receiving one of the neighboring participants using the recovered specially generated signature key to a sending one of the neighboring participants for verification using at least one of the first nonce or the specially generated verification key.

2. The document management system as defined in claim 1 wherein the transmitted, recovered second nonce forms a traceable and verifiable log within the document.

3. The document management system as defined in claim 2 wherein:

the workflow includes a plurality of receiving participants;

a respective plurality of the second nonces of the plurality of receiving participants are recovered along the workflow; and the plurality of recovered second nonces form the traceable and verifiable log.

4. The document management system as defined in claim 2, further comprising a record in the log including an entry including the transmitted, recovered second nonce and a corresponding version of the composite document.

5. The document management system as defined in claim 1 wherein both the corresponding, randomly generated nonces and the complementary workflow assurance tokens are distributed within the respective map-files of the neighboring participants.

6. The document management system as defined in claim 1, further comprising an executable file embedded in the document prior to its transmission.

7. The document management system as defined in claim 1 wherein the communication mechanism is a network, a compact disc, a universal serial bus (USB), or a shared drive.

8. The document management system as defined in claim 1, further comprising a public-posting system that supports the document.

9. The document management system as defined in claim 8 wherein the public-posting system is a cloud computing system.

10. The document management system as defined in claim 1 wherein the private key is to identify a corresponding entry in an entry table which enables the receiving one of the neighboring participants to recover a map-file name and a map-file decryption key for the map-file of the receiving one of the neighboring participants, and wherein the map-file name and the map-file decryption key are to respectively identify and decrypt the map-file of the receiving one of the neighboring participants to recover the at least one of the second nonce or the specially generated signature key.

11. A document management method, comprising:

distributing at least one of corresponding, randomly generated nonces or complementary workflow assurance tokens within respective map-files of a document, wherein the respective map-files are of neighboring participants in a workflow of the document, wherein the distributing is accomplished by a number generator or a secure controller of a secure authoring tool including computer readable code, embodied on a tangible, non-transitory, computer readable medium, the code being executable by a processing device, and wherein the distributing includes:

a) providing a first of the nonces in the map-file of a sending one of the neighboring participants and a second of the nonces in the map-file of a receiving one of the neighboring participants, wherein the first and second nonces are identical; or b) providing the complementary workflow assurance tokens as a pair of specially generated signature and verification keys such that the specially generated signature key is provided in the map-file of a receiving one of the neighboring participants and the specially generated verification key is provided in the map-file of a sending one of the neighboring participants; or c) both a and b;

receiving the document at a receiving one of the neighboring participants;

recovering at least one of the second nonce of the receiving one of the neighboring participants or the specially generated signature key of the receiving one of the neighboring participants; and transmitting at least one of the recovered second nonce or a signature generated by the receiving one of the neighboring participants using the recovered specially generated signature key to the sending one of the neighboring participants for verification using at least one of the first nonce or the specially generated verification key.

12. The document management method as defined in claim 11 wherein prior to transmitting, the method further comprises generating the signature using the recovered specially generated signature key.

13. The method as defined in claim 11, further comprising generating a traceable and verifiable log within the document using the transmitted, recovered second nonce.

14. The method as defined in claim 13, further comprising:

receiving the recovered second nonce of the receiving one of the neighboring participants;

transmitting an acknowledgement signature of the sending one of the neighboring participants to the receiving one of the neighboring participants; and incorporating the acknowledgement signature in the traceable and verifiable log.

15. The method as defined in claim 11, further comprising embedding an executable file in the document prior to its transmission.

16. The method as defined in claim 11 wherein the transmitting is accomplished via a network, a compact disc, a universal serial bus (USB), or a shared drive.

17. The method as defined in claim 11 wherein:

both the corresponding, randomly generated nonces and the complementary workflow assurance tokens are distributed within the respective map-files of the document;

both the second nonce of the receiving one of the neighboring participants and the specially generated signature key of the receiving one of the neighboring participants are recovered; and both the second nonce of the receiving one of the neighboring participants and the signature generated by the receiving one of the neighboring participants are transmitted to the sending one of the neighboring participants.

18. The method as defined in claim 11 wherein prior to the distributing of the corresponding, randomly generated nonces, the method further includes generating the corresponding, randomly generated nonces via a number generator.

19. The method as defined in claim 11 wherein prior to the distributing of the complementary workflow assurance tokens, the method further includes generating the complementary workflow assurance tokens via a secure controller.

20. The method as defined in claim 11 wherein recovering the at least one of the second nonce or the specially generated signature key includes:
- using a private decryption key to identify, in an entry table, an entry corresponding to the receiving one of the neighboring participants;
- from the entry, recovering a map-file name and a map-file decryption key generated for the receiving one of the neighboring participants;
- using the map-file name to identify the map-file of the receiving one of the neighboring participants; and
- decrypting the map-file of the receiving one of the neighboring participants.

* * * * *